United States Patent
Sommers et al.

(10) Patent No.: US 9,630,546 B2
(45) Date of Patent: Apr. 25, 2017

(54) LIFT UNIT FOR HOIST

(71) Applicant: Wastebuilt Environmental Solutions, LLC, Summit, IL (US)

(72) Inventors: Randall Sommers, Kewanna, IN (US); Donald Galbreath, Winamac, IN (US); Troy A. Elkenberry, Rochester, IN (US); Jeffrey J. Smith, Rochester, IN (US)

(73) Assignee: Wastebuilt Environmental Solutions, LLC, Summit, IL (US)

( * ) Notice: Subject to any disclaimer, the term of this patent is extended or adjusted under 35 U.S.C. 154(b) by 415 days.

(21) Appl. No.: 14/278,364

(22) Filed: May 15, 2014

(65) Prior Publication Data

US 2014/0341686 A1    Nov. 20, 2014

Related U.S. Application Data

(60) Provisional application No. 61/823,660, filed on May 15, 2013.

(51) Int. Cl.
*B60P 1/64* (2006.01)

(52) U.S. Cl.
CPC .................. *B60P 1/6454* (2013.01)

(58) Field of Classification Search
CPC ...... B60P 1/6454; B60P 1/6418; B60P 1/6427
USPC ................. 298/19 B, 22 R, 22 J, 22 B, 22 D
See application file for complete search history.

(56) References Cited

U.S. PATENT DOCUMENTS

| | | | |
|---|---|---|---|
| 1,482,510 A | 2/1924 | Maurice | |
| 2,220,815 A | 11/1940 | Feilcke | |
| 2,326,594 A | 8/1943 | Wood | |
| 2,476,694 A | 7/1949 | Bourne | |
| 2,988,399 A | 12/1960 | Wood | |
| 3,192,875 A | 7/1965 | Kroeger et al. | |
| 3,202,458 A | 8/1965 | Domes | |
| 3,204,796 A | 9/1965 | Hand | |
| 3,848,758 A * | 11/1974 | Carter | B60P 7/14 414/469 |
| 3,964,625 A | 6/1976 | Wirz | |
| 3,985,254 A | 10/1976 | Grandury | |
| 4,409,903 A * | 10/1983 | Wilhelmsson | B60P 1/6427 104/162 |
| 4,488,756 A * | 12/1984 | Dalman | B60P 1/16 298/19 B |
| 4,762,370 A * | 8/1988 | Corompt | B60P 1/20 298/19 B |
| 5,069,507 A | 12/1991 | Lindsey | |
| 5,088,795 A * | 2/1992 | Chen | B60P 1/6418 298/22 J |
| 5,197,782 A * | 3/1993 | May | B60P 1/26 298/22 R |

(Continued)

*Primary Examiner* — Kaitlin Joerger
(74) *Attorney, Agent, or Firm* — Barnes & Thornburg LLP

(57) ABSTRACT

A container handling system is adapted to move, deploy, and retrieve containers used to manage waste or other materials. The container handling system includes a vehicle and a hoist unit coupled to the vehicle to move therewith and relative to the vehicle. The hoist unit includes a hoist frame and a hoist-frame mover coupled to both the vehicle and the hoist frame to cause the hoist frame to move between a transport position in which the hoist frame is generally horizontal and a use position in which the hoist frame is arranged at an angle relative to the horizontal to facilitate deployment and retrieval of containers.

36 Claims, 16 Drawing Sheets

(56) References Cited

U.S. PATENT DOCUMENTS

| | | | |
|---|---|---|---|
| 5,580,211 A | 12/1996 | Mengel | |
| 5,934,860 A * | 8/1999 | Hotte | B60P 1/6454 414/498 |
| 6,068,440 A * | 5/2000 | Lang | B60P 7/13 414/480 |
| 6,186,596 B1 * | 2/2001 | Jones | B60P 1/16 298/19 B |
| 6,419,292 B1 * | 7/2002 | Calcote | B60P 1/6454 296/35.3 |
| 6,505,891 B1 * | 1/2003 | Hickey | B60P 1/16 298/20 A |
| 6,543,856 B2 * | 4/2003 | Jones | B60P 1/283 298/19 B |
| 6,561,589 B2 * | 5/2003 | Jones | B60P 1/283 298/19 B |
| 6,761,525 B2 | 7/2004 | Hollinrake et al. | |
| 6,854,546 B2 | 2/2005 | Beckstrom | |
| 7,074,004 B2 * | 7/2006 | Lockamy | B60P 1/6427 414/549 |
| 7,112,030 B2 * | 9/2006 | Renziehausen | B60P 1/6454 414/477 |
| 7,182,406 B2 | 2/2007 | Ahlberg | |
| 7,568,881 B1 * | 8/2009 | Collins | B60P 1/6463 414/346 |
| RE41,126 E | 2/2010 | Hurlburt | |
| 8,306,706 B2 * | 11/2012 | Kim | B60P 1/483 280/6.15 |
| 8,434,991 B1 * | 5/2013 | Hacker | B60P 1/6427 414/542 |
| 8,444,365 B2 * | 5/2013 | Duell | B60P 1/6454 414/494 |
| 8,465,246 B2 * | 6/2013 | Duell | B60P 1/6463 414/480 |
| 8,961,097 B2 * | 2/2015 | Doron | B60P 1/6454 414/482 |
| 2004/0151564 A1 * | 8/2004 | Waguespack | B60P 1/6454 414/491 |
| 2005/0254928 A1 * | 11/2005 | Budd | B60P 1/6454 414/543 |
| 2009/0257854 A1 * | 10/2009 | Wright | B60P 1/6454 414/499 |
| 2013/0084152 A1 * | 4/2013 | Duell | B60P 1/00 414/559 |

\* cited by examiner

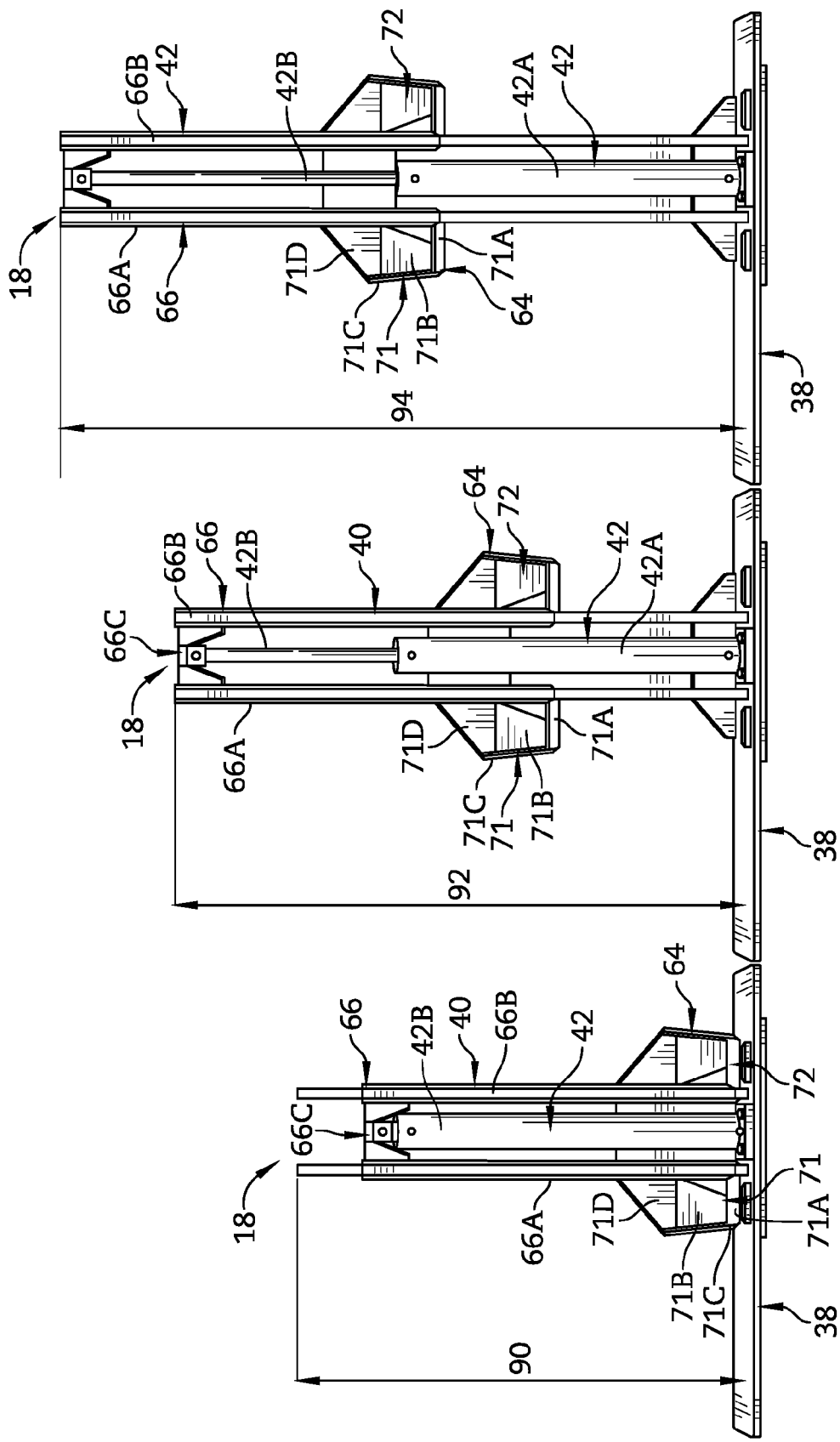

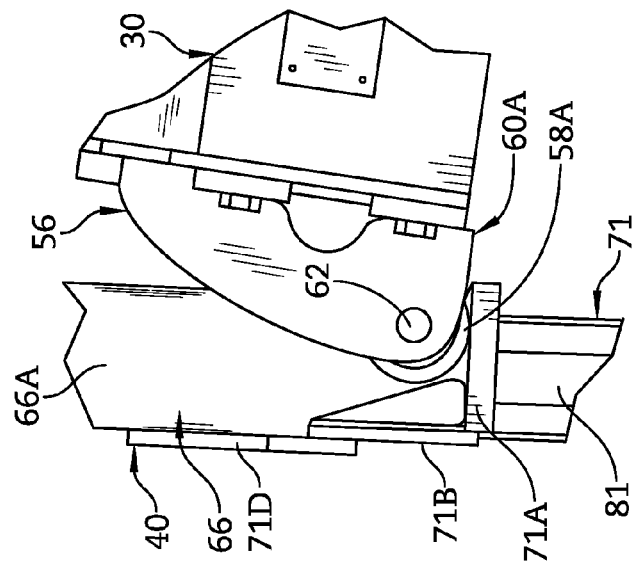
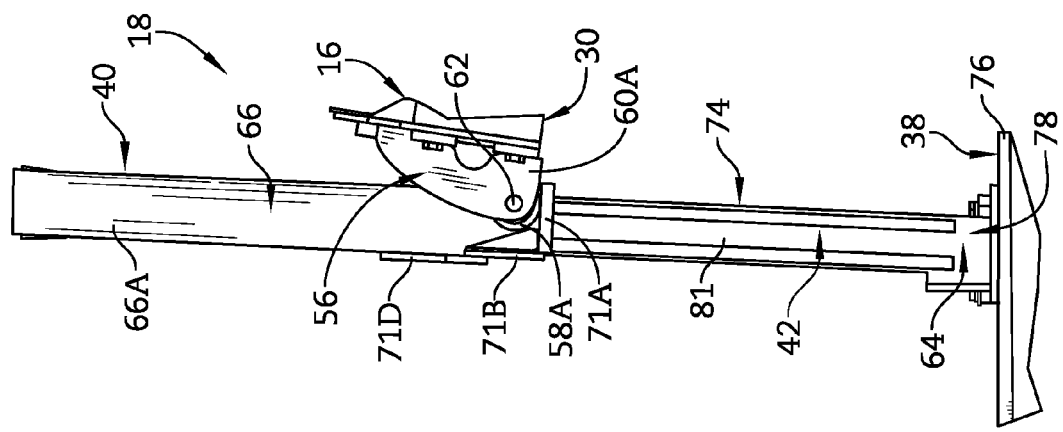

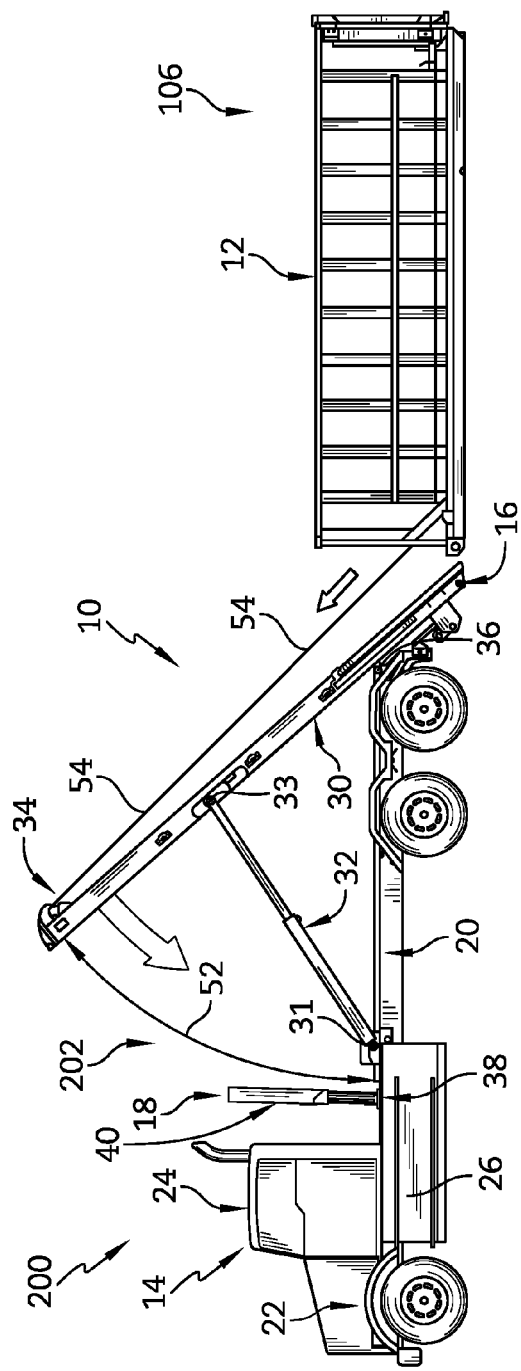
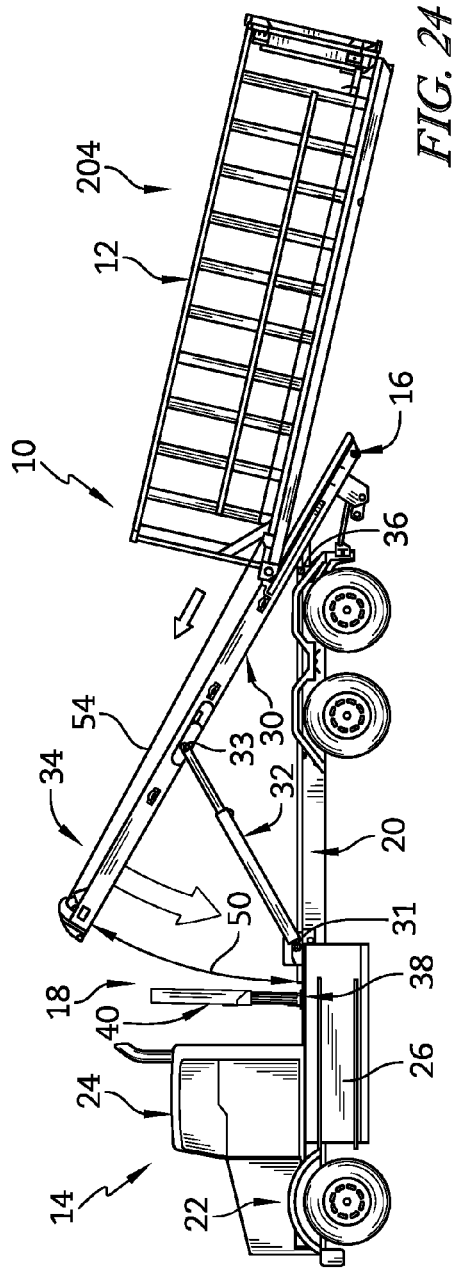

LIFT UNIT FOR HOIST

PRIORITY CLAIM

This application claims priority under 35 U.S.C. §119(e) to U.S. Provisional Application Ser. No. 61/823,660, filed May 15, 2013, which is expressly incorporated by reference herein.

BACKGROUND

The present disclosure relates to container handling equipment, and particularly to container handling equipment mounted to a vehicle. More particularly, the present disclosure relates to a hoist unit coupled to a vehicle and configured to deploy and retrieve containers from the vehicle in the field.

SUMMARY

According to the present disclosure, a container handling system is adapted to move, deploy, and retrieve containers used to manage waste or other materials. The container handling system includes a vehicle and a hoist unit coupled to the vehicle to move therewith and relative to the vehicle. The hoist unit includes a hoist frame and a hoist-frame mover coupled to both the vehicle and the hoist frame to cause the hoist frame to move between a transport position in which the hoist frame is generally horizontal and a use position in which the hoist frame is arranged at an angle relative to the horizontal to facilitate deployment and retrieval of containers.

In illustrative embodiments, the container handling system further includes a lift unit. The lift unit is configured to provide means for moving the hoist frame from the transport position to a hoist-transition position without application of substantial force from the hoist-frame mover so that the hoist frame is arranged to cause mechanical advantage to be developed in the hoist-transition position so that the amount of power required to move the hoist frame between the transport position and the use position is minimized.

In illustrative embodiments, the lift unit engages a forward end of the hoist frame to maximize a moment arm length. The lift unit is further configured to provide means for cushioning and slowing downward movement of the hoist frame during movement of the hoist frame from the use position to the transport position without use of a modulating input from an operator so that wear and damage to the container handling system is minimized.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective view of a container handling system including a vehicle, a hoist unit arranged in a transport position and configured to deploy a container as suggested in FIGS. 18-22 and retrieve the container as suggested in FIGS. 23-27, and a lift unit arranged in a lowered lift position and coupled to the vehicle to cause the hoist unit to pivot up and down through an initial range of motion as suggested in FIGS. 2 and 3;

FIG. 2 is a view similar to FIG. 1 showing the lift unit in an intermediate lift position causing the hoist unit to be in an associated mid-lift hoist position in which movement of the hoist is primarily handled by the lift unit;

FIG. 3 is a view similar to FIG. 2 showing the lift unit in a raised lift position as a result of continued upward movement of the lift unit relative to the vehicle and showing the hoist unit in a hoist-transition position in which movement of the hoist frame included in the hoist unit is transferred from the lift unit to linear actuators included in the hoist unit so that the hoist frame can continue to move to the use position as shown in FIGS. 21 and 22;

FIG. 4 is an exploded assembly view of the container handling system of FIGS. 1-3 showing that the container handling system includes, from top to bottom, the lift unit, the hoist unit, and the vehicle;

FIG. 5 is an exploded assembly view of the lift unit of FIGS. 1-4 showing that the lift unit includes, from top to bottom, a hoist carriage configured to engage with and support the hoist, a carriage foundation coupled to the vehicle in a fixed position, and a lift-unit actuator interconnecting the hoist carriage and the carriage foundation to cause the hoist carriage to move up and down relative to the carriage foundation as suggested in FIGS. 6-8;

FIG. 6 is a front elevation view of the lift unit of FIGS. 4 and 5 showing the lift unit in the lowered lift position;

FIG. 7 is a view similar to FIG. 6 showing the lift unit in the intermediate lift position;

FIG. 8 is a view similar to FIG. 7 showing the lift unit in the raised lift position;

Figure 1:
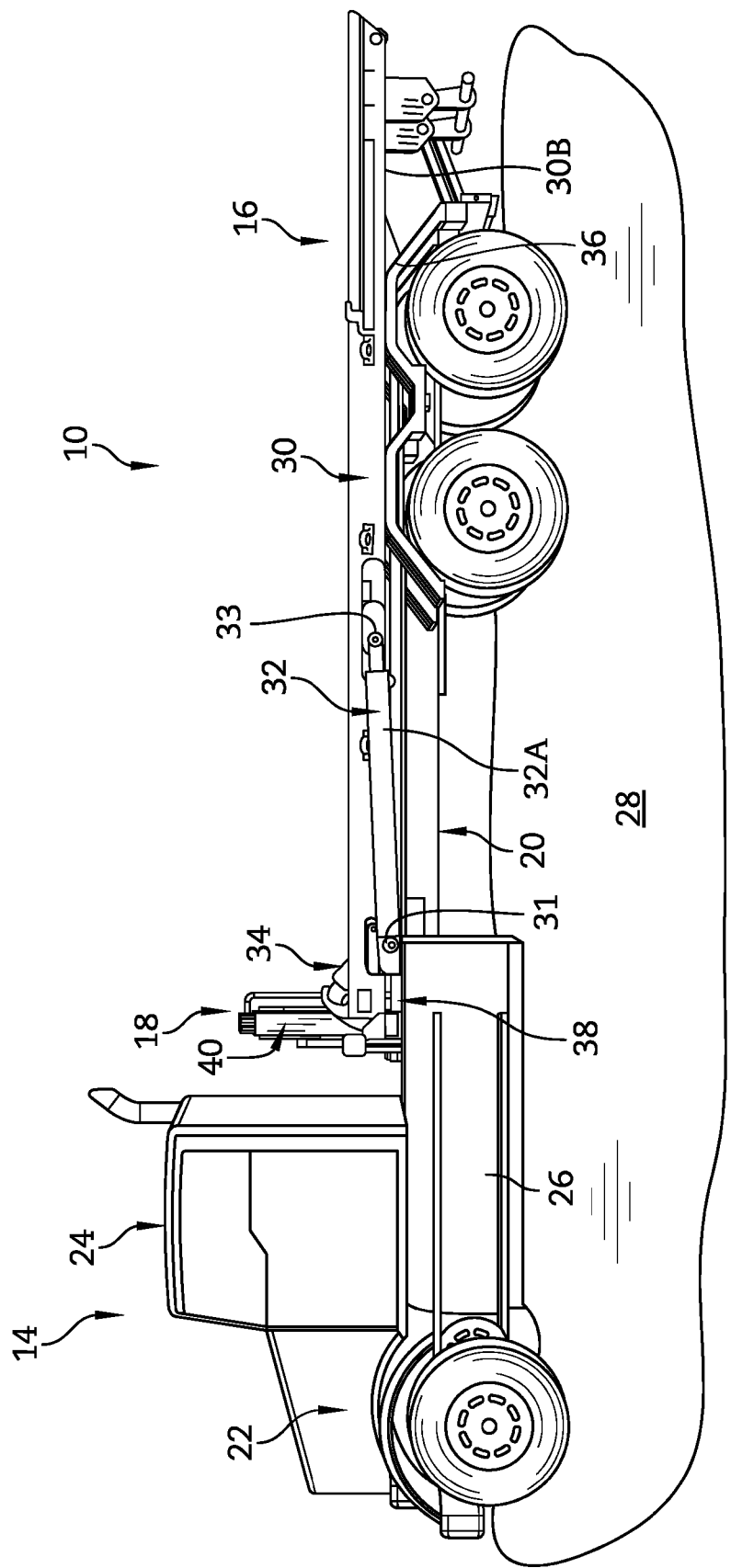
Figure 9:
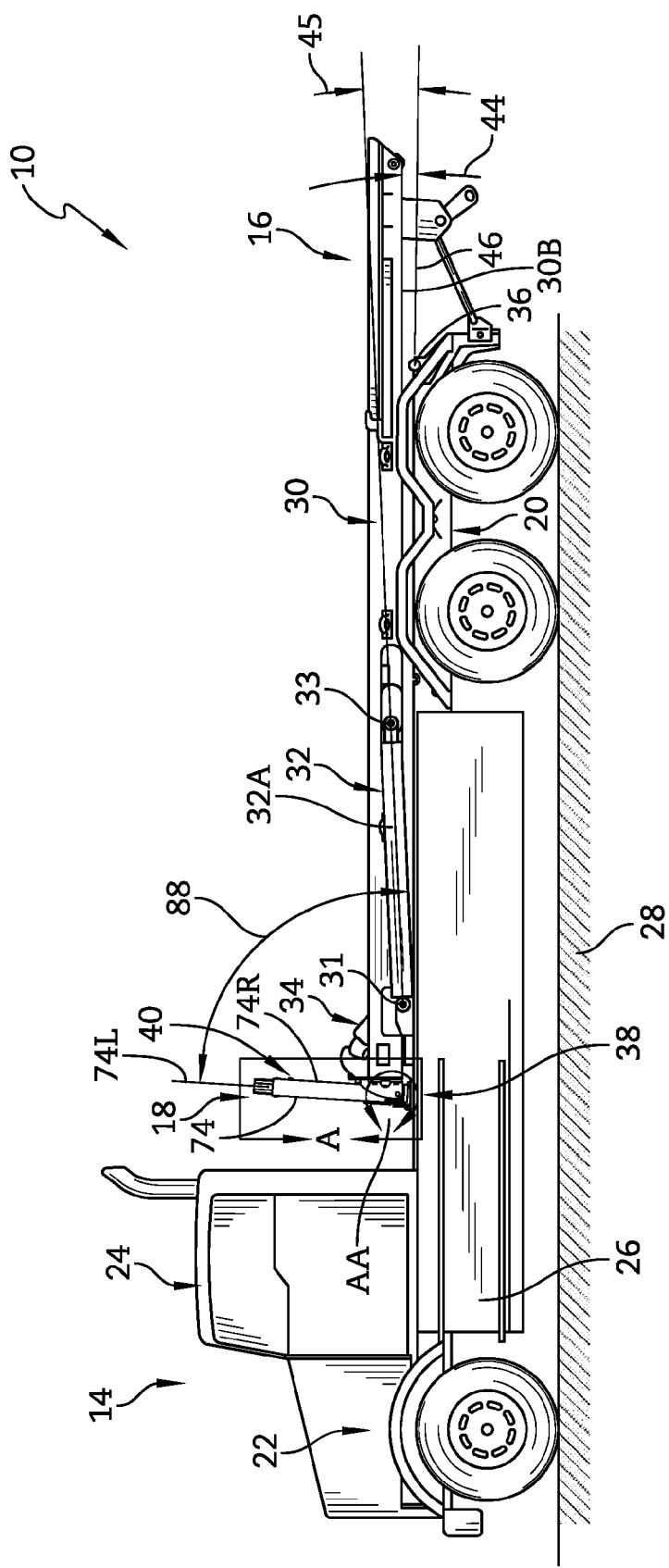
Figure 11:
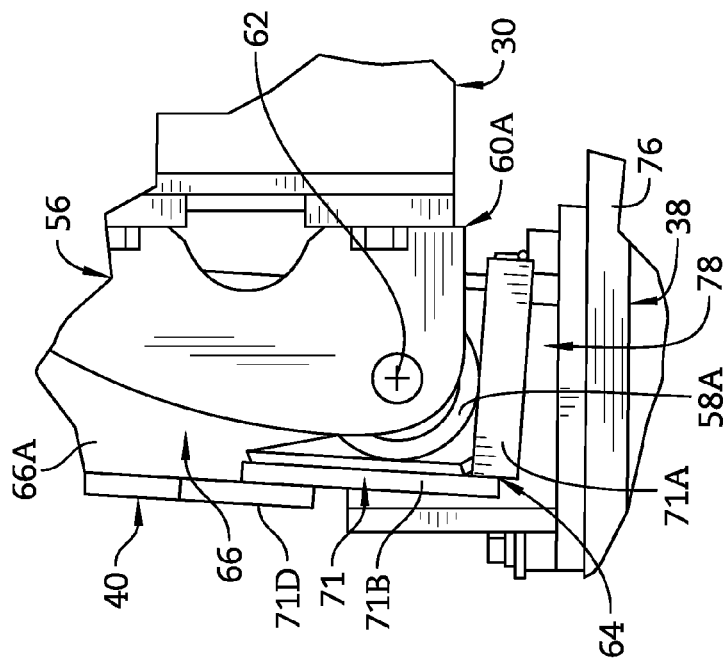
Figure 10:
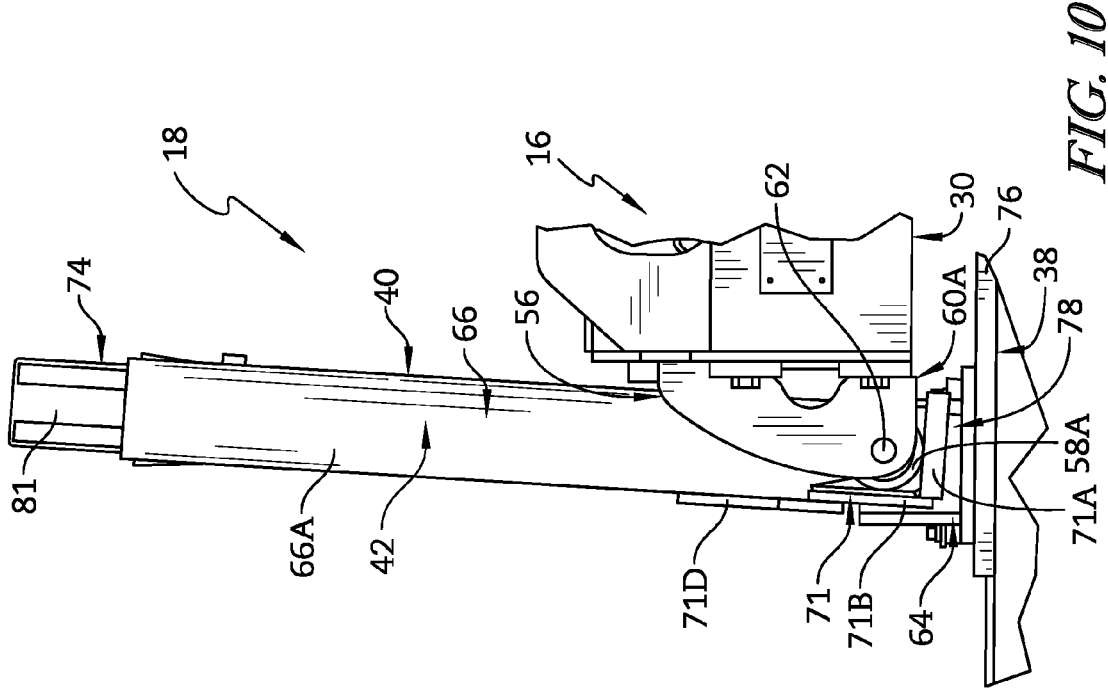
Figure 12:
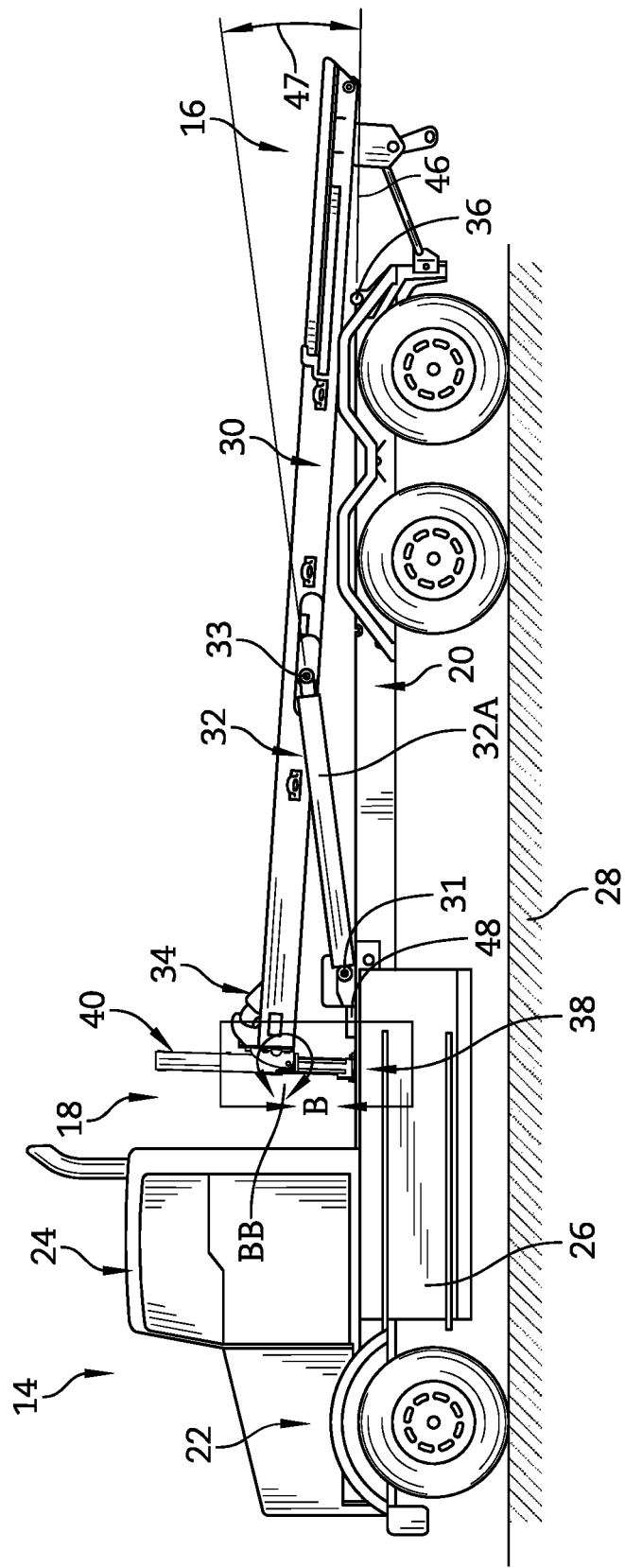
Figure 14:
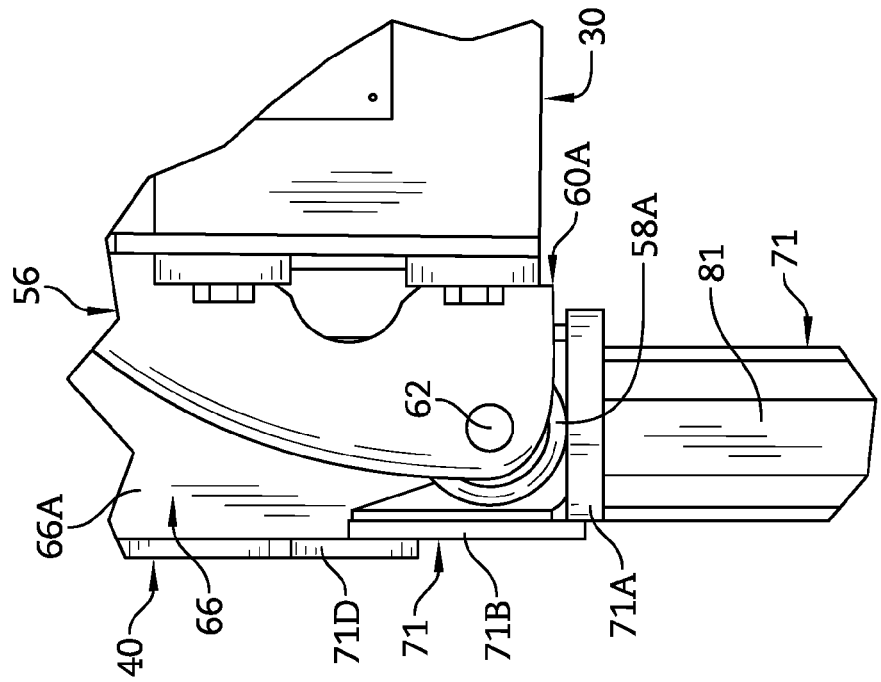
Figure 13:
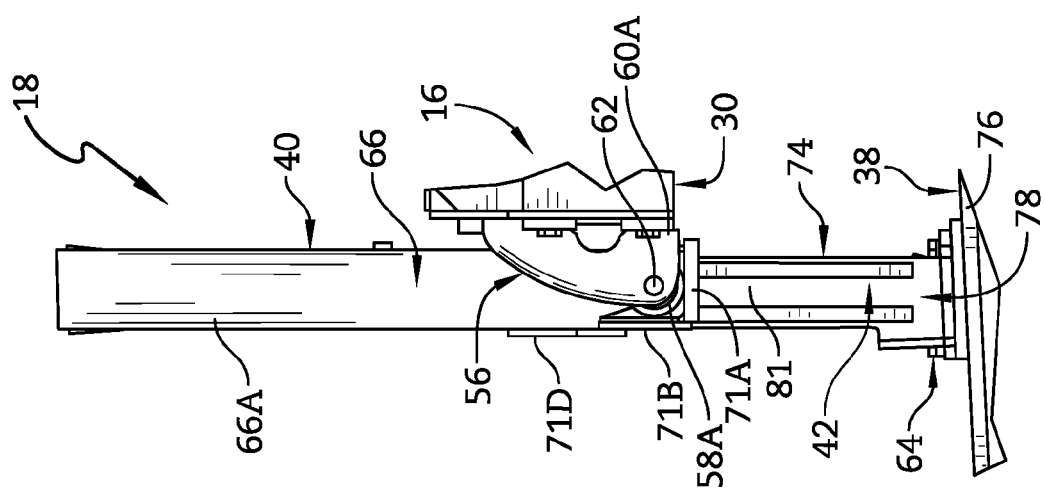
Figure 15:
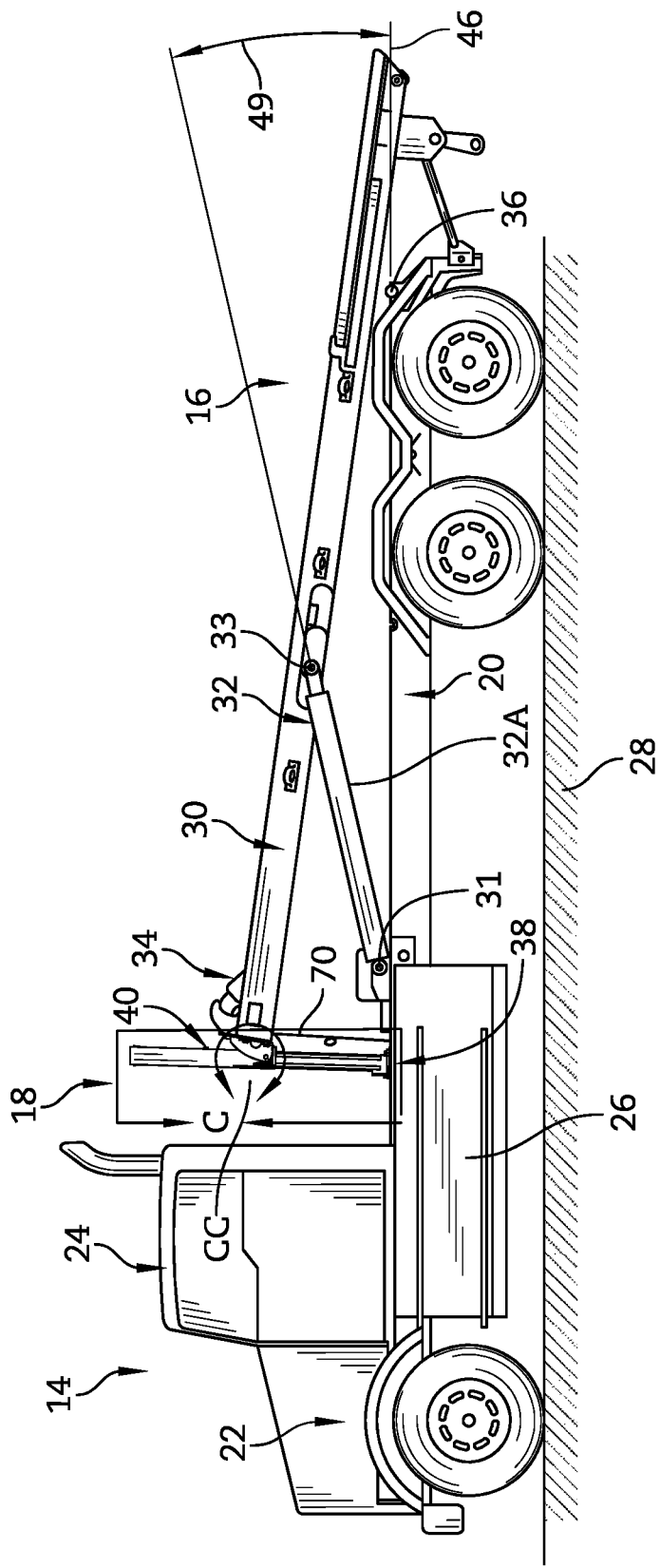
Figure 18:
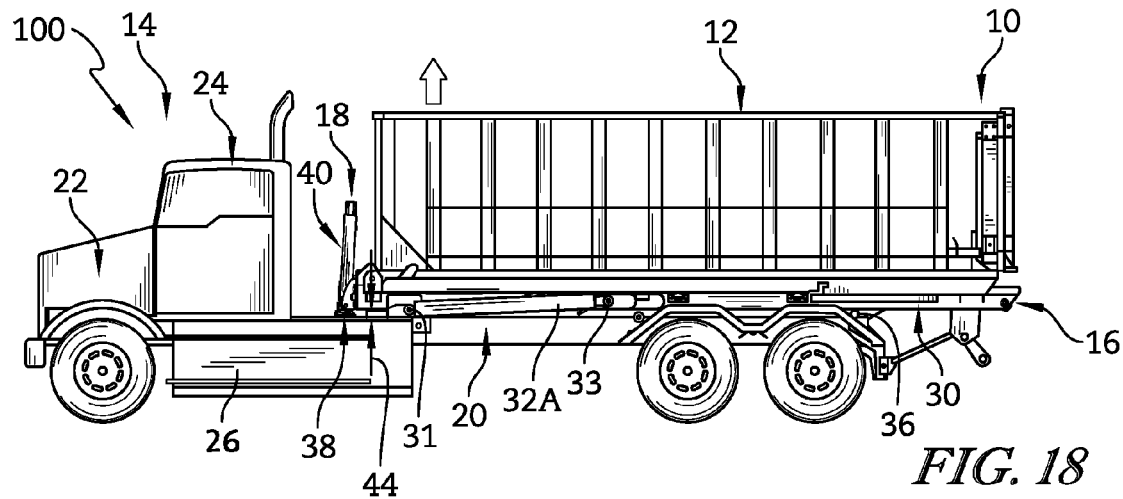
Figure 19:
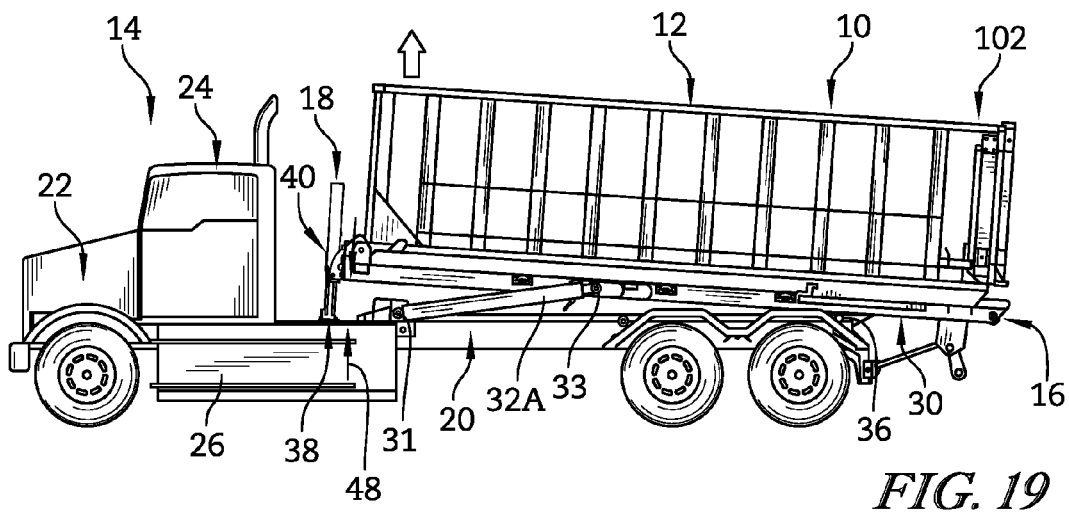
Figure 20:
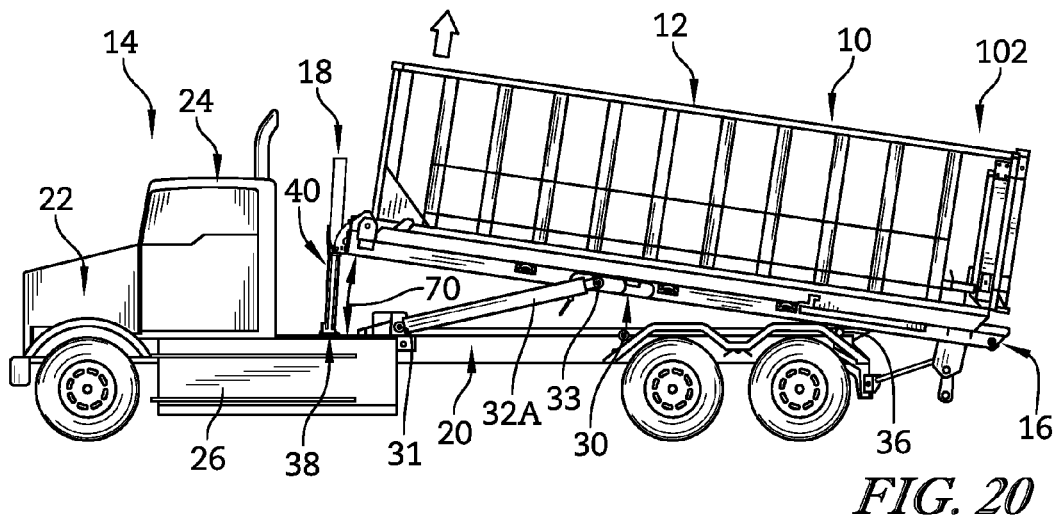
Figure 21:
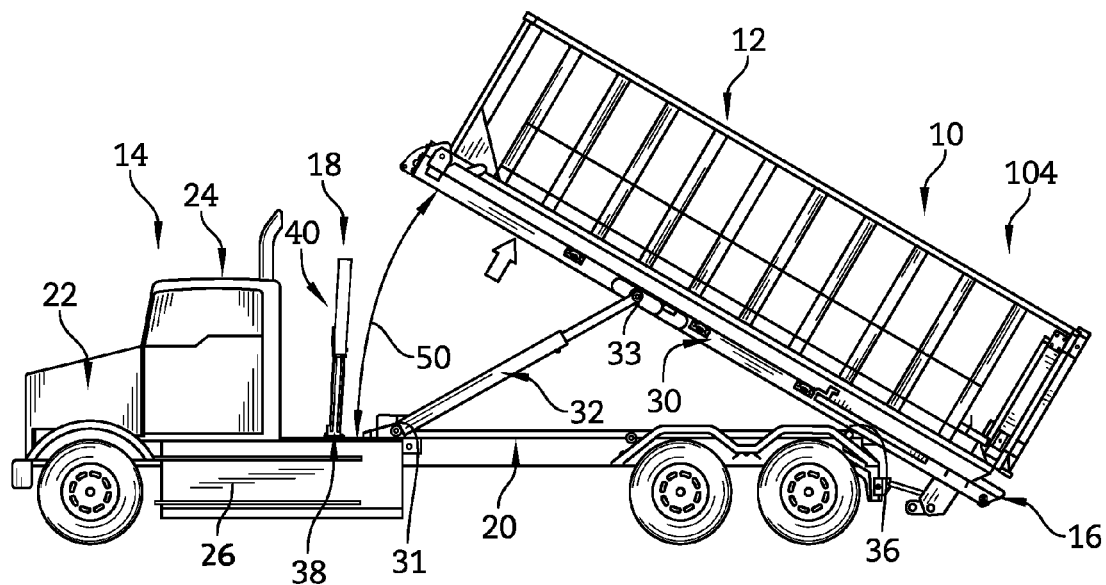
Figure 22:
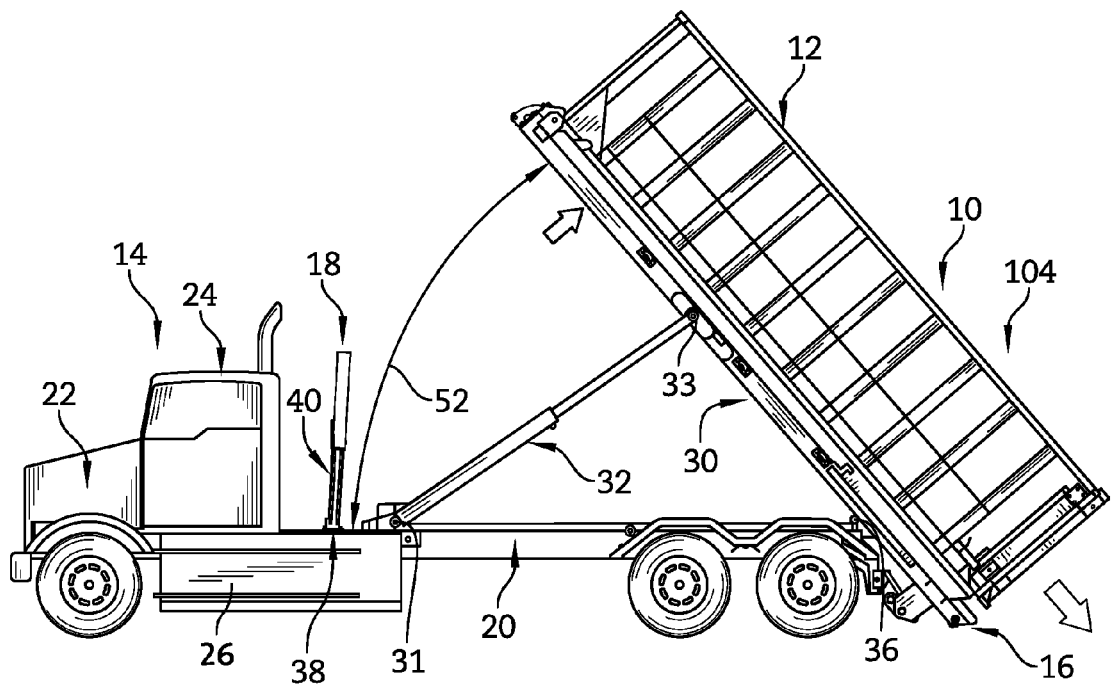
Figure 25:
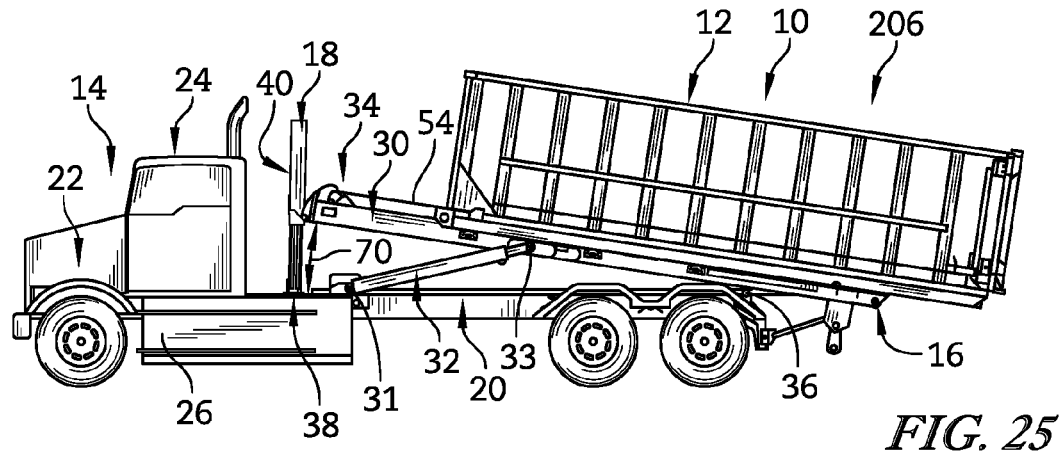
Figure 26:
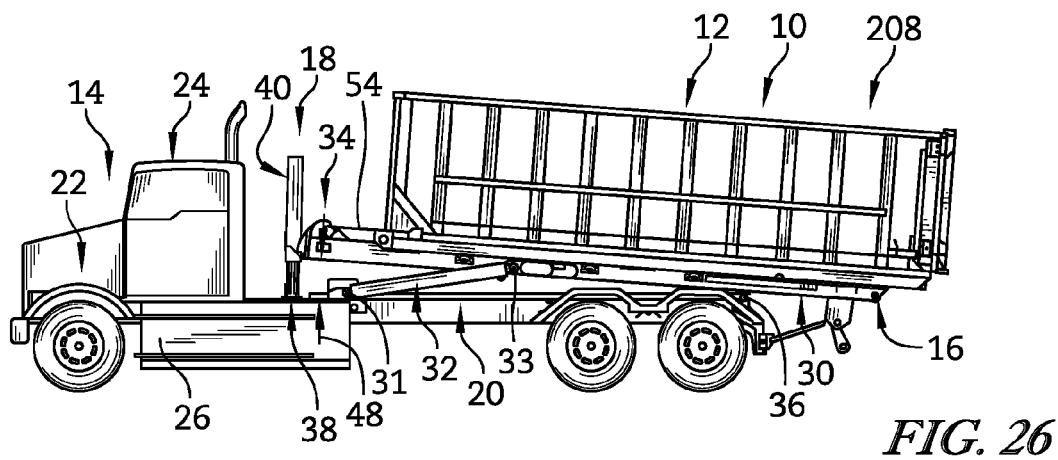
Figure 27:
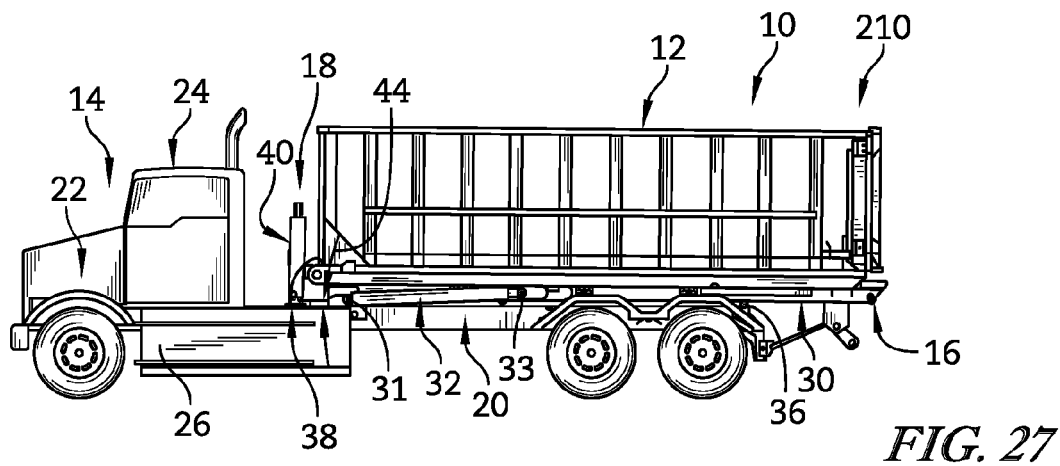

FIG. 9 is a side elevation view of the container handling system of FIG. 1 showing the lift unit in the lowered position and the hoist unit in an associated storage position and suggesting that the lift unit is arranged at an acute angle relative to a reference plane to minimize binding between the lift unit and the hoist unit as the lift unit moves the hoist unit towards the hoist-transition position;

FIG. 10 is an enlarged partial elevation view taken from the box marked A on FIG. 9 showing that the lift unit is in the lowered lift position and the hoist unit is in an associated transport position;

FIG. 11 is an enlarged partial elevation view taken from the circle marked AA on FIG. 9 showing that a roller included in a hoist arm of the hoist unit is supported by a lift pocket included in the lift unit and arranged so that the roller engages the floor of the lift pocket without engaging the front wall of the lift pocket;

FIG. 12 is a view similar to FIG. 9 showing the lift unit moved to the intermediate lift position which causes the hoist unit to move to the mid-lift hoist position;

FIG. 13 is an enlarged partial elevation view taken from the box marked B on FIG. 12 showing that the lift-unit actuator has moved the lift carriage upwardly relative to the carriage foundation to cause the lift unit to assume the intermediate lift position;

FIG. 14 is an enlarged partial elevation view taken from the circle marked BB of FIG. 12 showing that the roller included in the hoist unit is in generally the same position relative to the lift pocket as when the lift unit was in the lowered lift position of FIGS. 9-11 as a result of the lift unit being arranged at the acute angle relative to the reference plane;

FIG. 15 is a view similar to FIG. 12 showing the lift unit moved to the raised lift position which causes the hoist unit to move to the hoist-transition position in which the linear actuators included in the hoist unit take over movement of the hoist frame relative to the vehicle;

FIG. 16 is an enlarged partial elevation view taken from the box marked C on FIG. 15 showing that the lift-unit actuator has continued moving the lift carriage upwardly relative to the carriage foundation to cause the lift unit to assume the raised lift position;

FIG. 17 is an enlarged partial elevation view taken from the circle marked CC on FIG. 15 showing that the roller included in the hoist unit has moved away from the front wall of the lift pocket by rolling on the floor of the lift pocket as the lift unit moves toward the raised lift position;

FIGS. 18-22 are a series of views showing one illustrative example of deployment of a container from a container handling system;

FIG. 18 is a side elevation view of the container handling system of FIG. 1 in a transport arrangement with a container coupled to the hoist unit for transport;

FIG. 19 is a view similar to FIG. 18 showing the lift unit moved to the intermediate lift position causing the hoist unit to move to the mid-lift hoist position;

FIG. 20 is a view similar to FIG. 19 showing the lift unit moved to the raised lift position causing the hoist unit to move to the associated hoist-transition position where the linear actuators included in the hoist unit take over lifting of the hoist frame and the container relative to the vehicle as suggested in FIG. 21;

FIG. 21 is a view similar to FIG. 20 showing the lift unit in the raised position and that the hoist unit has moved to the extended hoist position as a result of the linear actuators applying force to the hoist frame;

FIG. 22 is a view similar to FIG. 21 showing the lift unit in the raised position and that the hoist unit has continued moving to the use position in which the container may be rolled off the hoist unit onto ground underlying and supporting the container handling system as suggested in FIG. 23 or the container may be emptied;

FIGS. 23-27 are a series of views showing one illustrative example of picking up of a container by the container handling system for movement to another location;

FIG. 23 is a side elevation view of the container handling system of FIGS. 1 and 18 showing the hoist unit in the use position and a hoist cable coupled to a front end of a container supported by ground in spaced-apart relation to the container handling system and suggesting that a cable actuator included in the hoist unit applies a force to the cable to move the cable and container toward the container handling system as suggested in FIG. 24;

FIG. 24 is a view similar to FIG. 23 showing that as the hoist cable pulls the container onto the hoist frame, the hoist frame is lowered to the extended hoist position, and the lift unit remains in the raised position ready to receive the hoist frame as the hoist unit moves toward the hoist-transition position as suggested in FIG. 25;

FIG. 25 is a view similar to FIG. 24 showing that the hoist cable has continued to pull the container toward the lift unit while the hoist frame continues to be lowered to achieve the hoist-transition position and engage the lift unit so that the lift unit may cushion and support the hoist frame and any load thereon as the lift unit continues to move the hoist unit toward the transport position as suggested in FIG. 27;

FIG. 26 is a view similar to FIG. 25 showing that the hoist cable continues to pull the container toward the lift unit while the lift unit is in the intermediate lift position supporting the hoist unit in the mid-lift hoist position; and FIG. 27 is a view similar to FIG. 26 showing the container transport system in the transport arrangement with the container rolled into a final position on the hoist frame ready for transport.

DETAILED DESCRIPTION

Figure 2:
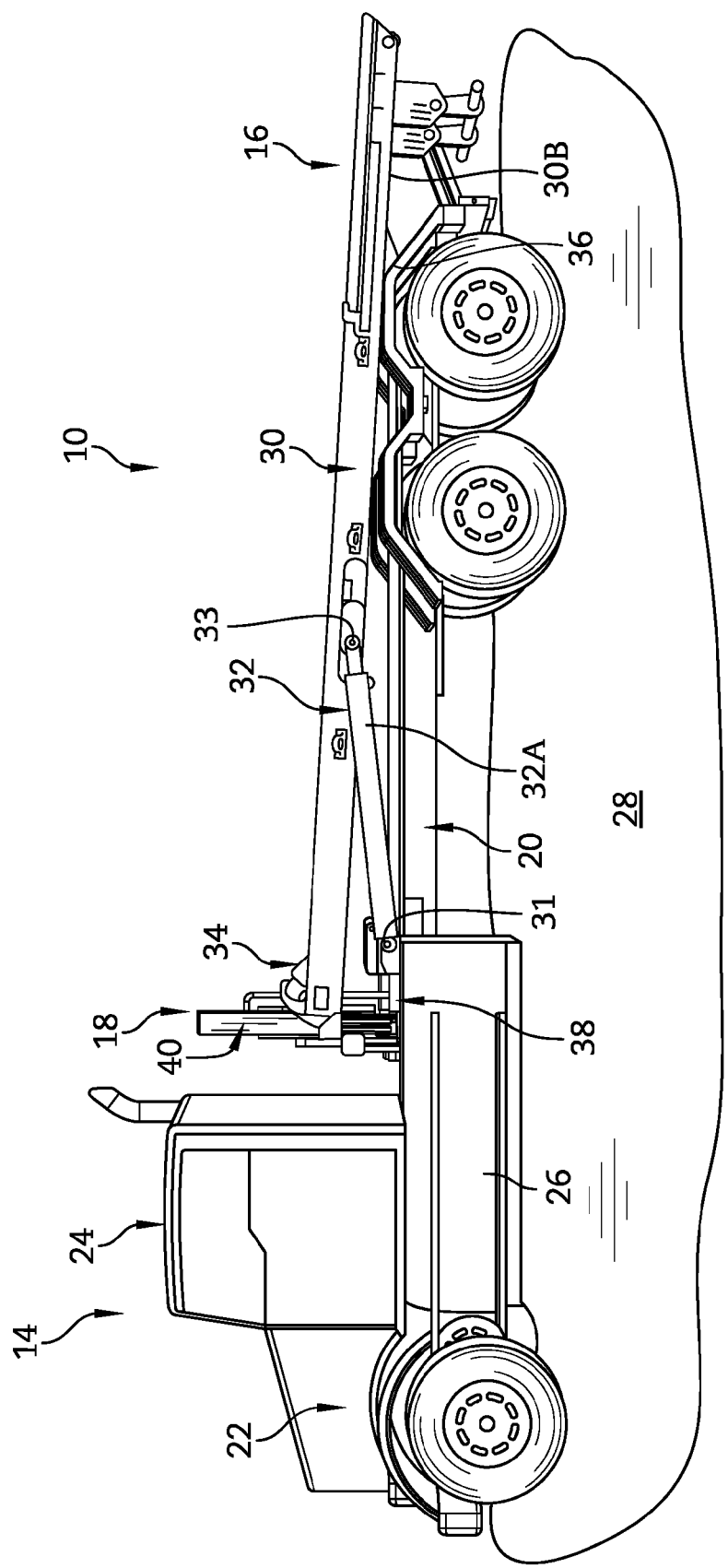
Figure 3:
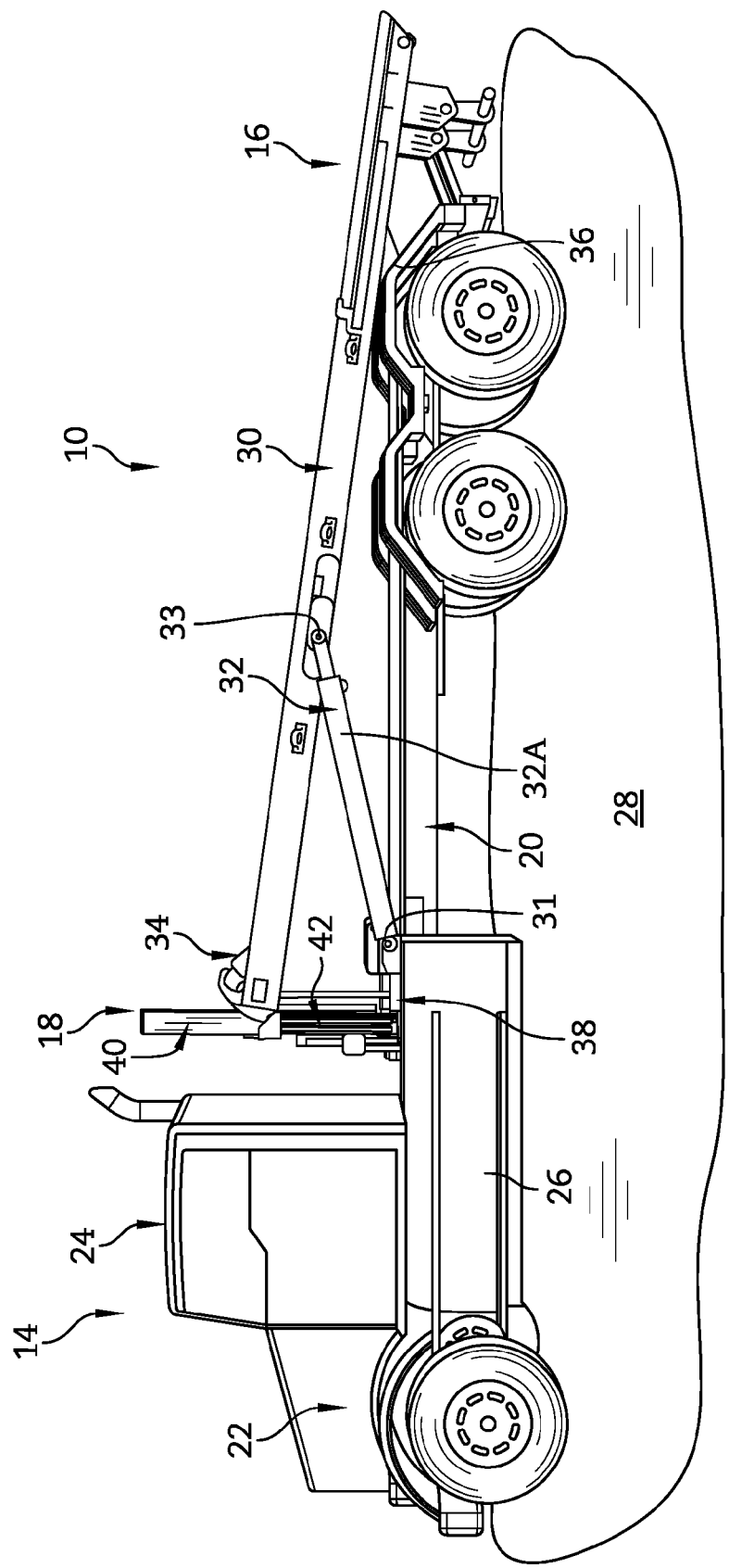

A container handling system 10 in accordance with the present disclosure is shown, for example, in FIGS. 1-3. The container handling system 10 is configured to move a container 12, for example, an open-top waste container 12, from one location to another location. The container handling system 10 includes a vehicle 14, a hoist unit 16, and a lift unit 18 as shown in FIGS. 1-5. The hoist unit 16 is coupled to the vehicle 14 to move therewith and located above a vehicle frame 20 included the vehicle 14 due to interference with fuel tanks 26 located below vehicle frame 14. The hoist unit 16 is configured to deploy the container 12 as shown in FIGS. 18-22 and retrieve the container 12 as shown in FIGS. 23-27. The lift unit 18 is coupled to the vehicle 14 and configured to provide means for lifting a portion of the hoist unit 16 during an initial stage of container deployment and lowering the portion of the hoist unit 16 during a final stage of container retrieval so that stress imparted to the vehicle 14 by the hoist unit 16 is minimized while complexity and sizing of a power source for the hoist unit 16 and the lift unit 18 are also minimized.

The vehicle 14, for example, is a commercial over-the-road truck chassis. The vehicle 14 includes a vehicle frame 20, a drive train 22, an operator cab 24, and a pair of fuel tanks 26 as shown in FIGS. 1-4. The operator cab 24 is coupled to the vehicle frame 20 to extend upwardly away from the vehicle frame 20 and ground 28 underlying the vehicle 14. The fuel tanks 26 are coupled to the vehicle frame 20 and arranged to extend downwardly from the vehicle frame 20 toward ground 28 and towards a rear of the vehicle 14.

The fuel tanks 26 provide fuel to the drive train which converts stored energy in the fuel into power which drives the vehicle 14 over the ground 28 and provides power to the hoist unit 16 and the lift unit 18. In one illustrative example, the fuel is Compressed Natural Gas (CNG) which is stored in relatively large fuel tanks 26 as shown in FIGS. 1-4 and 9. As a result of the relatively large fuel tanks 26, the hoist unit 16 is located substantially above the vehicle frame 20. The relatively large fuel tanks 26 or other equipment, like storage containers, would interfere with below frame mounting of the hoist unit 16. As a result, the hoist unit 16 is coupled to the vehicle frame 20 above the vehicle frame 20 to minimize interference between the hoist unit 16 and the relatively large fuel tanks 26 or other equipment located below the vehicle frame.

Figure 4:
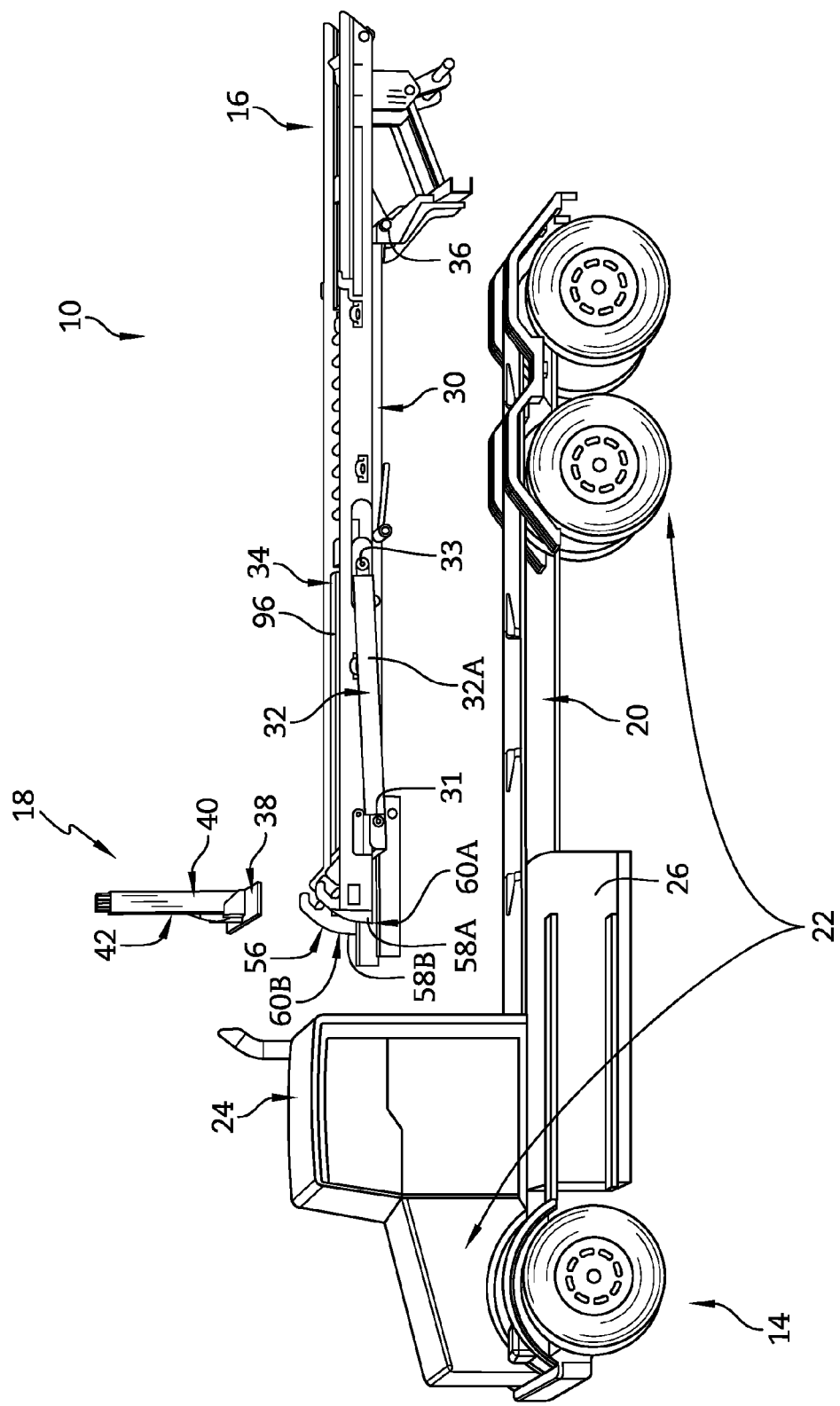

The hoist unit 16 is coupled to the vehicle frame 20 as shown in FIGS. 1-4. The hoist unit 16 includes a hoist frame 30, a hoist-frame mover 32, and a container-movement system 34 as shown in FIG. 4. The hoist frame 30 is coupled to the vehicle frame 20 to pivot about a frame axis 36 between a transport position shown in FIGS. 1 and 9 and a use position as shown in FIGS. 22 and 23. The hoist-frame mover 32 is coupled to the vehicle 14 at a first mover axis 31 and at the hoist frame 30 at a second mover axis 33. The hoist-frame mover 32 is arranged to extend between and interconnect the vehicle frame 20 and the hoist frame 30 to cause the hoist frame 30 to move through various positions as shown in FIGS. 18-27. The container-movement system 34 is coupled to the hoist frame 30 and adapted to couple to the container 12 to cause the container 12 to roll on and off the hoist frame 30 as suggested in FIGS. 23-27.

Figure 5:
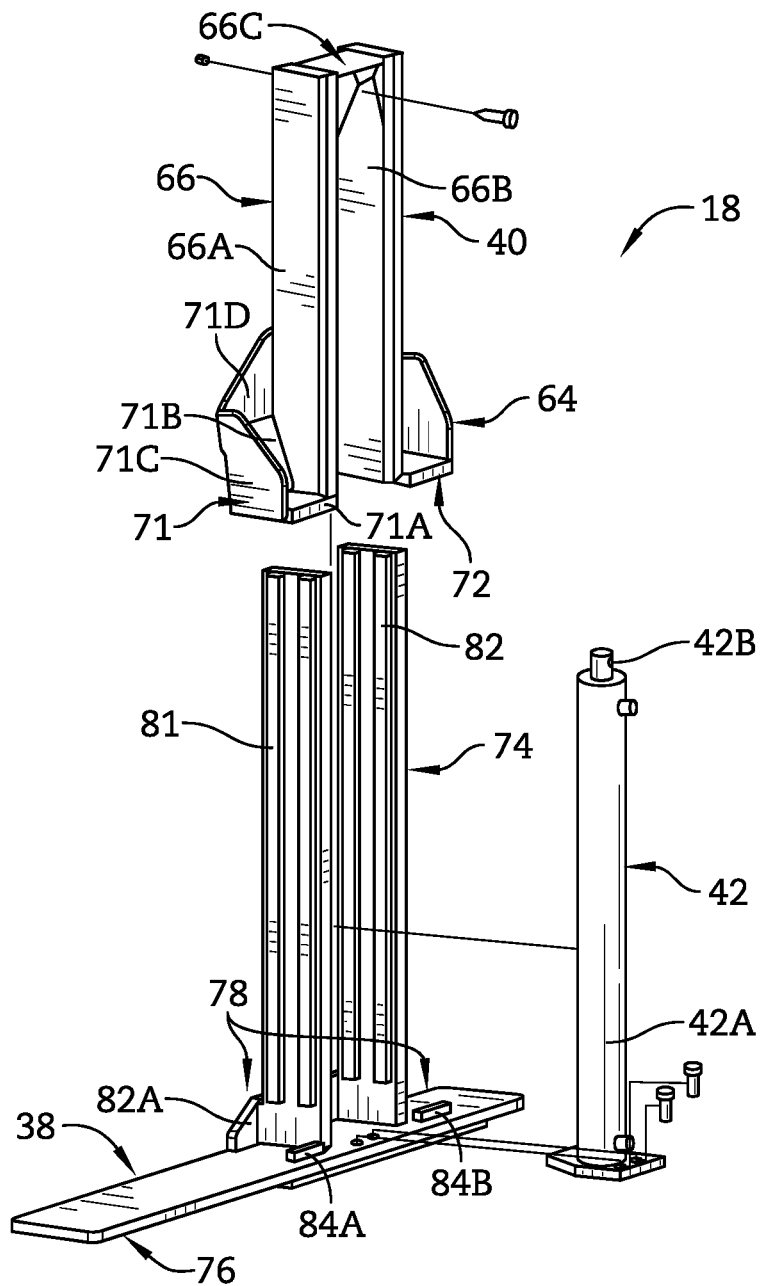

The lift unit 18 is coupled to the vehicle frame 20 as shown in FIGS. 1-4. The lift unit 18 includes a carriage foundation 38, a hoist carriage 40, and a lift-unit actuator 42 as shown in FIG. 5. The carriage foundation 38, for example, is coupled to the vehicle frame 20 in a fixed position relative to the vehicle frame 20. The hoist carriage 40 is coupled to the carriage foundation 38 to move up and down relative to the carriage foundation 38 between a lowered lift position shown in FIG. 6, an intermediate lift position shown in FIG. 7, and a raised lift position shown in FIG. 8. The lift-unit actuator 42 is arranged to extend between and interconnect the carriage foundation 38 and the hoist carriage 40 to cause the hoist carriage 40 to move between the lowered lift position, the intermediate lift position, and the raised lift position as shown in FIGS. 6-9.

In example of use, the container handling system 10 begins in a first location with the container 12 located on the hoist frame 30 and coupled to the hoist frame 30 by the container-movement system 34 as suggested in FIG. 18. The container handling system 10 may then be moved to a remote second location using vehicle 14 where the container 12 is deployed using one example of a container-deployment process 100 as suggested in FIGS. 19-23.

The container-deployment process 100 includes an operation 102 in which the lift unit 18 moves from the lowered lift position shown in FIG. 18 through the intermediate lift position shown in FIG. 19 and to the raised lift position shown in FIG. 20. The lift unit 18 is coupled to the hoist unit 16 to cause the hoist unit 16 and the container 12 to move therewith. As a result, the hoist unit 16 moves from the transport position shown in FIG. 18 through the mid-lift hoist position shown in FIG. 19 and to the hoist-transition position shown in FIG. 20.

When the hoist unit 16 is in the transport position, a first angle 44 of about two degrees is defined between a bottom surface 30B of the hoist frame 30 and a horizontal reference plane 46 as shown in FIG. 9. At the same time, a first hoist angle 45 of about 3.7 degrees is established between the hoist-frame mover 32 and the horizontal reference plane 46. The horizontal reference plane 46 plane is generally parallel to ground 28 underlying vehicle frame 14 and both the first mover axis 31 and the frame axis 36 lie in the horizontal reference plane 46.

When the hoist unit 16 is in the mid-lift hoist position, a second angle 48 of about four degrees is defined between the bottom surface 30B and the horizontal reference plane 46 as shown in FIG. 12. At the same time, a second hoist angle 47 of about nine degrees is defined between the hoist-frame mover 32 and the horizontal reference plane 46.

When the hoist unit 16 is in the hoist-transition position, a third angle 70 of about nine degrees is defined between the bottom surface 30B and the horizontal reference plane 46 as shown in FIG. 15. At the same time, a third hoist angle 49 of about fourteen degrees is defined between the hoist-frame mover 32 and the horizontal reference plane 46.

When the hoist unit 16 is in the transport position, the hoist frame 30 is at the first hoist angle 45. If the hoist-frame mover 32 were to apply a mover force to the hoist unit 16 when in the transport position, then less than about 10 percent of the mover force would be used in a vertical direction to lift the hoist frame 30 and any empty or loaded container resting on the hoist frame. In addition, more than about 90 percent of the applied force would be used in a horizontal direction which applies significant unwanted force to the vehicle frame 20 and the hoist frame 30. This situation is avoided by using the lift unit 18 to move the hoist frame 30 from the transport position to the hoist-transition position while the hoist-frame mover applies minimal force during the move to the hoist frame 30.

When the hoist unit 16 is in the hoist-transition position, the hoist frame mover 32 applies the mover force to the hoist frame 30 at the third hoist angle 49. As a result, about 24 percent of the mover force is used in the vertical direction to lift the hoist frame 30 and any container coupled thereto. Thus, force imparted to the vehicle frame 20 minimized. At the same time, substantial mechanical advantage is developed for the hoist-frame mover 32 to begin moving the hoist frame 30 relative to the vehicle frame 20 while minimizing longitudinal stress applied to the vehicle frame 20 as suggested in FIG. 15

Once the hoist unit 16 is in the hoist-transition position, the container-deployment process 100 then proceeds to a subsequent operation 104 in which the hoist-frame mover 32 moves the hoist unit 16 from the hoist-transition position shown in FIG. 20 through the extended hoist position shown in FIG. 21 to the use position shown in FIG. 22. When the hoist unit 16 is in the extended hoist position, a fourth angle 50 of about 30 degrees is defined between the bottom surface 30B and the horizontal reference plane 46. When the hoist unit 16 is in the use position, a fifth angle 52 of about 49 degrees is defined between the bottom surface 30B and the horizontal reference plane 46.

Once the hoist unit 16 is in the use position, the container-deployment process 100 then proceeds to a subsequent operation 106 in which the container-movement system 34 is activated to cause the container 12 to roll along the hoist frame 30 and onto ground 28 supporting the vehicle 14 as shown in FIG. 23. Once the container 12 is supported substantially by ground 28, the container-deployment process 100 proceeds to another operation in which the container 12 is uncoupled from the container-movement system and left in spaced-apart relation to the container handling system 10 as suggested in FIG. 23. The container-deployment process 100 then proceeds to a final operation in which the container 12 is detached from the container handling system 10.

In another example of use, the container handling system 10 begins in a first location with the container 12 located on ground 28 near the container handling system 10 as suggested in FIG. 23. The container 12 may be retrieved for movement to another location using one example of a container-retrieval process 200 as shown in FIGS. 23-27. The container-retrieval process 200 begins with an operation in which the container 12 is coupled to the container-movement system 34 as shown in FIG. 23. The container-retrieval process 200 then proceeds to a subsequent operation 202 in which the hoist unit 16 is moved to the use position and the lift unit 18 is moved to the raised lift position as shown in FIG. 23.

Once the hoist unit 16 is in the use position and the cable 54 is coupled to the container 12, the container-retrieval process 200 proceeds another operation 204 in which container-movement system 34 is activated causing the container 12 to move toward and onto the hoist frame 30 while the hoist-frame mover 32 causes the hoist frame 30 to move towards the extended hoist position as shown in FIG. 24.

The container-retrieval process 200 then proceeds to an operation 206 in which the container-movement system 34 continues moving the container 12 along the hoist frame 30 toward operator cab 24. At the same time, the hoist-frame mover 32 causes the hoist frame 30 to continue moving toward the hoist-transition position as shown in FIG. 25. As the hoist frame 30 achieves the hoist-transition position, the hoist frame 30 engages the lift unit 18 as shown in FIG. 25. The lift unit 18 operates to cushion and support the hoist frame 30 and any load thereon as the hoist unit 16 is moving toward the storage position. In addition, the lift unit 18 also operates to slow downward movement of the hoist frame 30 and container 12 without input from an operator to feather or modulate control the hoist frame mover so that slamming of the hoist frame 30 and the container 12 onto the vehicle 14 is minimized. Without the lift unit 18, slamming is prone to occur due to the large amount of mass accelerating under the force of gravity toward the vehicle frame when the hoist unit 16 is moving from the use position to the storage position.

Once the hoist unit 16 is in the hoist-transition position, the container-retrieval process 200 then proceeds to an operation 208 in which the lowering of the hoist frame 30 is transferred from the hoist-frame mover 32 to the lift unit 18. During the subsequent operation 210, the lift unit 18 moves from the raised lift position through the intermediate lift position and to the lowered lift position as shown in FIG. 18. At the same time, the hoist frame 30 moves with the lift unit 18 from the hoist-transition position through the mid-lift hoist position to the transport position as shown in FIG. 27. Once the hoist unit 16 is in the transport position, the container-retrieval process 200 may be complete. However, other operations may occur which couple the container 12 to the vehicle 14 to block unintended movement of the container 12 during transport.

During movement of the hoist unit 16 between the transport position, the mid-lift hoist position, and the hoist-transition position, the hoist unit 16 is engaged with the lift unit 18 as shown in FIGS. 9-17. The hoist unit 16 includes the hoist frame 30, the hoist-frame mover 32, and the container-movement system 34 as discussed above and shown in FIG. 4. The hoist unit 16 further includes a hoist arm 56 as shown in FIGS. 9-11. The hoist arm 56 is coupled to a front end of the hoist frame 30 and arranged to extend toward the operator cab 24 and engage with the lift unit 18 when the hoist unit 16 is in one of the transport, mid-lift hoist, and hoist-transition positions as shown in FIGS. 9-17.

The hoist arm 56 includes, for example, a first roller 58A, a second roller 58B, a first roller support 60A, and a second roller support 60B as shown in FIGS. 10 and 11. The first roller support 60A interconnects the first roller 58A to the hoist frame 30 as shown in FIG. 4. The second roller support 60B is positioned to lie in spaced-apart lateral relation to the first roller support 60A and configured to interconnect the second roller 58B to the hoist frame 30.

The second roller 58B is substantively the same as the first roller 58A, and thus, only the first roller 58A will be discussed in detail. The second roller support 60B is substantively the same as the first roller support 60A, and thus, only the first roller support 60A will be discussed in detail. The first roller support 60A, for example, is coupled to the hoist frame 30 in a fixed position relative to the hoist frame 30 to move therewith. The first roller 58A is coupled to the first roller support 60A to rotate relative to the first roller support 60A about a roller axis 62 as shown in FIG. 11. The first roller 58A is arranged to engage and roll on the hoist carriage 40 as shown in FIGS. 11, 14, and 17. The first roller 58A rolls away from the operator cab 24 as the lift unit 18 moves from the lowered lift position of FIG. 11 and toward the raised lift position of FIG. 17. The first roller 58A minimizes friction between the hoist unit 16 and the lift unit 18 while the hoist unit 16 is in engagement with the lift unit 18.

As shown, for example, in FIG. 5, the lift unit 18 includes the carriage foundation 38, the hoist carriage 40, and the lift-unit actuator 42. The first and second rollers 58A, 58B of the hoist arm 56 engage and roll on the hoist carriage 40 as shown in FIGS. 10, 11, 13, 14, 16, and 17. The hoist carriage 40 includes, for example, a hoist-arm receiver 64 and a carriage frame 66 as shown in FIG. 5. The carriage frame 66 is coupled to the carriage foundation 38 to move up and down relative to the carriage foundation 38. The hoist-arm receiver 64 is coupled to the carriage frame 66 in a fixed position relative to the carriage frame 66 to move therewith. The rollers 58A, 58B of the hoist arm 56 are received in the hoist-arm receiver 64 as shown in FIGS. 9-17.

The carriage frame 66 includes a first slide tube 66A, a second slide tube 66B, and a lift bracket 66C as shown in FIG. 5. The second slide tube 66B is located in spaced-apart lateral relation to the first slide tube 66A to locate the lift-unit actuator 42 therebetween. The lift bracket 66C extends between and interconnects the first and second slide tubes 66A, 66B. As shown in FIG. 5, the lift bracket 66C is coupled to the first and second slide tubes 66A, 66B at upper ends of the slide tubes 66A, 66B. The lift-unit actuator 42 is coupled to the lift bracket 66C to cause the hoist carriage 40 to move up and down relative to the carriage foundation 38 as shown in FIGS. 6-8

The hoist-arm receiver 64 includes a first lift pocket 71 and a second lift pocket 72 as shown in FIG. 5. The second lift pocket 72 is spaced-apart laterally from the first lift pocket 71 to locate the carriage frame 66 therebetween. The first lift pocket 71 is configured to receive the first roller 58A therein and the second lift pocket 72 is configured to receive the second roller 58B therein. As suggested in FIG. 5, the first lift pocket 71 is coupled to an opposite bottom end of the first slide tube 66A to move therewith and extend laterally away from the first and second slide tubes 66A, 66B. The second lift pocket 72 is coupled to an opposite bottom end of the second slide tube 66B to move therewith and extend laterally away from the first and second slide tubes 66A, 66B.

The second lift pocket 72 is substantially the same as the first lift pocket 71, and thus, only the first lift pocket 71 will be discussed in detail. The first lift pocket 71 includes a floor 71A, a front wall 71B, a side wall 71C, and a gusset 71D as shown in FIG. 5. The floor 71A is coupled to the first slide tube 66A in a fixed position to move therewith and arranged to lie in a generally horizontal plane parallel to ground 28. The front wall 71B is coupled to both the floor 71A and the first slide tube 66A and is arranged to extend upwardly away from the floor 71A. The side wall 71C is coupled to both the front wall 71B and the floor 71A in spaced-apart lateral relation to the first slide tube 66A.

When the hoist unit 16 is engaged with the lift unit 18, the first roller 58A lies between the first slide tube 66A and the side wall 71C and engages and rolls on the floor 71A. The first roller 58A, when the hoist unit 16 is in the transport position, lies on the floor 71A and in spaced-apart relation to the front wall 71B. As the lift unit 18 moves upwardly, the roller 58A rolls on the floor 71A away from the front wall 71B as shown in FIGS. 14 and 17 until the hoist unit 16 moves away from and disengages from the lift unit 18 as shown, for example, in FIGS. 21 and 22.

The hoist carriage 40 is configured to translate up and down relative to the carriage foundation 38 as shown in FIGS. 6-8. The carriage foundation 38 includes a carriage guide 74, a foundation support plate 76, and a carriage receiver 78 as shown in FIG. 5. The foundation support plate 76 is coupled to the drive train 22 of the vehicle 14 in a fixed position and arranged to lie in a generally horizontal plane that is generally parallel to ground 28. The carriage guide 74 is coupled to the foundation support plate 76 in a fixed position and arranged to extend upwardly away from the foundation support plate 76 and the drive train 22 as shown in FIG. 9. A lift-unit angle 88 is defined between a line 74L that is generally parallel to a rearward-facing surface 74R of the carriage guide 74 and the horizontal reference plane 46 as shown in FIG. 9. In some embodiments, the lift-unit angle is about 80 degrees to about 90 degrees. In the illustrative embodiment, the lift-unit angle 88 is about 88 degrees. The horizontal reference plane 46 is defined by both the first mover axis 31 and the second mover axis 33. The lift-unit angle 88 is configured so that the carriage foundation 38 is arranged to lie at a tangent to a circular travel path of the hoist frame 30 as suggested in FIG. 9.

The carriage guide 74 includes a first guide beam 81 and a second guide beam 82 as shown in FIG. 5. The second guide beam 82 is spaced apart laterally from the first guide beam 81 to locate the lift-unit actuator 42 therebetween. The second guide beam 82 is substantially the same as the first guide beam 81, and thus, only the first guide beam 81 will be discussed in detail. The first guide beam 81 is coupled to the foundation support plate 76 in a fixed position and arranged to extend upwardly from the foundation support plate 76 at the lift-unit angle 88 as shown in FIG. 9.

The first slide tube 66A is formed to include a passageway therein and is sized to receive the first guide beam 81 therein. In one example, both the first guide beam 81 and the first slide tube 66A have rectangular cross sections that are configured to minimize rotation of the first slide tube 66A relative to the first guide beam 81. A bearing, grease, or any other suitable means may be located between the first slide tube 66A and the first guide beam 81 to minimize friction developed therebetween during movement of the first slide tube 66A relative to the first guide beam 81.

The carriage receiver 78 is coupled to both the foundation support plate 76 and the carriage guide 74 as shown in FIG. 5. The carriage receiver 78 includes a first gusset 82A, a first retainer tab 84A, a second gusset, and a second retainer tab 84B as suggested in FIG. 5. The second gusset is substantially the same as the first gusset 82A, and thus, only the first gusset 82A will be discussed in detail. The second retainer tab 84B is substantially the same as the first retainer tab 84A, and thus, only the first retainer tab 84A will be discussed in detail. The first gusset 82A is coupled to both a forward-facing surface 74F of the first guide beam 81 and the foundation support plate 76. The first retainer tab 84A is located in longitudinally spaced-apart relation to the first gusset 82A to locate the first lift pocket 71 of the hoist carriage 40 therebetween when the lift unit 18 is in the lowered lift position as suggested in FIG. 11.

The lift-unit actuator 42 is, for example, a linear actuator which functions to vary a length of the lift-unit actuator 42 in response to application of an input from the operator. In one example, the linear actuator is a hydraulic cylinder as shown in FIG. 5. The hydraulic cylinder includes a cylinder barrel 42A coupled in a fixed location to the foundation support plate 76 and a rod 42B coupled to the cylinder barrel 42A to move relative thereto in response to admission or removal of hydraulic fluid stored in the cylinder barrel 42A. The rod 42B is also coupled to the lift bracket 66C of the carriage frame 66 in a fixed position to cause the hoist carriage 40 to move therewith.

In an example of use, the lift unit 18 begins in the lowered lift position as shown in FIG. 6. The operator engages a valve to cause pressurized hydraulic fluid to be admitted into the cylinder barrel 42A which in turn causes the rod 42B to move upwardly away from the foundation support plate 76 as shown in FIG. 7. As the valve is continued to be engaged, the rod 42B moves upwardly to cause the lift unit 18 to assume the raised lift position as shown in FIG. 8.

In one example, the lift unit 18 has a lowered height 90 when in the lowered lift position. The lift unit 18 has a relatively greater intermediate height 92 when in the intermediate lift position. The lift unit 18 has a relatively greater raised height 94 when in the raised lift position. In one example, the relatively greater raised height 94 is about 28 inches larger than the lowered height 90. In another example, the relatively greater raised height 94 is about 33 inches larger than the lowered height 90.

The drive train 22 of the vehicle 14 may provide a source of power to the lift-unit actuator 42, the hoist-frame mover 32, and the container-movement system 34. As discussed previously, the lift-unit actuator 42 is a hydraulic cylinder. The hoist-frame mover 32, for example, includes first and second linear actuators 32A. The linear actuators 32A may be hydraulic cylinders. In addition, the container-movement system 34 includes the cable 54 and a linear actuator 96 which is coupled to the cable 54 to move the cable 54 as a length of the linear actuator 96 changes. The linear actuator 96 of the container-movement system 34 may also be a hydraulic cylinder.

In one example, the lift-unit actuator 42, the hoist-frame mover 32, and the container-movement system 34 are powered by pressurized hydraulic fluid. In the illustrative example, pressurized hydraulic fluid is only sent to one of the lift-unit actuator 42, the hoist-frame mover 32, and the container-movement system 34 at one time. Thus, each component 42, 32, 34 must be used in the proper order to achieve the desired result (deployment or retrieval of the container). In some embodiments, the pressurized hydraulic fluid may be provided by a hydraulic pump that increases a pressure of the hydraulic fluid to about 2,000 pounds per square inch to about 3,000 pounds per square inch. In the illustrative embodiment, the pressurized hydraulic fluid may be provided by a hydraulic pump that increases a pressure of the hydraulic fluid to about 2,500 pounds per square inch. Simplicity of the hydraulic system is minimized when all hydraulic cylinders included in the lift-unit actuator 42, the hoist-frame mover 32, and the container-movement system 34 are powered by hydraulic fluid at the same pressure.

The cost to manufacture, produce, and maintain the container handling system 10 of the present disclosure is minimized as a result of minimizing the hydraulic fluid pressure of the system. The container 12 when fully loaded may weigh as much as 60,000 pounds. As a result, significant force is imparted to the hoist frame 30 during movement of the hoist unit 16 to the transport position. Inclusion and use of the lift unit 18 minimizes maintenance costs because wear and damage to the container handling system 10 is minimized as a result of the lift unit 18 cushioning and slowing decent of the hoist frame 30 automatically during lowering of the hoist unit 16 from the use position to the transport position without intervention by the operator.

The invention claimed is:

1. A container handling system comprising
a vehicle,
a hoist unit coupled to the vehicle to move therewith and relative to the vehicle, the hoist unit including a hoist frame and a hoist-frame mover coupled to both the vehicle and the hoist frame to cause the hoist frame to move between a transport position in which the hoist frame is generally horizontal and a use position in which the hoist frame is arranged at an angle relative to the horizontal to facilitate deployment and retrieval of a container, and
a lift unit configured to provide lifting means for moving the hoist frame between the transport position and a hoist-transition position without application of substantial force from the hoist-frame mover so that the hoist frame is arranged to cause mechanical advantage to be used in the hoist-transition position so that an amount of power required to move the hoist frame between the transport position and the use position is minimized, wherein the lift unit includes a carriage foundation coupled to the vehicle in a fixed position relative to the vehicle, a hoist carriage coupled to the carriage foundation to translate relative thereto, and a lift-unit actuator extending between and interconnecting the carriage foundation and the hoist carriage to cause the hoist carriage to translate relative to the carriage foundation.

2. The container handling system of claim 1, wherein the hoist carriage is coupled to the carriage foundation to move up and down relative to the carriage foundation between a lowered lift position, an intermediate lift position, and a raised lift position.

3. The container handling system of claim 2, wherein the lift-unit actuator moves the hoist carriage between the lowered lift position and the intermediate lift position to cause the hoist frame to move between the transport position and a mid-lift hoist position.

4. The container handling system of claim 3, wherein the lift-unit actuator moves the hoist carriage between the intermediate lift position and the raised lift position to cause the hoist frame to move between the mid-lift hoist position and the hoist-transition position.

5. The container handling system of claim 2, wherein the lift unit has a lowered height when in the lowered lift position, an intermediate height that is relatively greater than the lowered height when in the intermediate lift position, and a raised height that is relatively greater than the intermediate height when in the raised lift position.

6. The container handling system of claim 1, wherein the hoist carriage includes a carriage frame coupled to the carriage foundation to move up and down relative to the carriage foundation and a hoist-arm receiver coupled to the carriage frame to move therewith.

7. The container handling system of claim 6, wherein the lift unit is further configured to move the hoist frame to a mid-lift hoist position that is between the transport position and the hoist-transition position, the hoist unit further includes a hoist arm coupled to a front end of the hoist frame and arranged to engage the lift unit when the hoist frame is in one of the transport, mid-lift hoist, and hoist-transition positions.

8. The container handling system of claim 1, wherein the lift-unit actuator and the hoist-frame mover are powered by a pressurized hydraulic fluid, and the pressurized hydraulic fluid is powered by a drivetrain of the vehicle.

9. The container handling system of claim 8, wherein the lift-unit actuator and the hoist-frame mover are powered by the pressurized hydraulic fluid at a single pressure.

10. The container handling system of claim 8, wherein the pressurized hydraulic fluid is pressurized to about 2,000 pounds per square inch to about 3,000 pounds per square inch.

11. The container handling system of claim 10, wherein the pressurized hydraulic fluid is pressurized to about 2,500 pounds per square inch.

12. The container handling system of claim 1, wherein the carriage foundation includes a foundation support plate coupled to a drivetrain included in the vehicle in a fixed position, a carriage guide coupled to the foundation support plate in a fixed position and arranged to extend upwardly away from the foundation support plate, and a carriage receiver coupled to both the carriage guide and the foundation support plate.

13. The container handling system of claim 1, wherein the hoist-frame mover applies a mover force to the hoist frame to move the hoist frame from the hoist-transition position to the use position, the lift unit moves the hoist frame to the hoist-transition position to cause greater than about 10 percent of the mover force to be applied to the hoist frame in a vertical direction during application of the mover force.

14. The container handling system of claim 13, wherein greater than about 24 percent of the mover force is applied to the hoist frame in the vertical direction during application of the mover force.

15. The container handling system of claim 1, wherein an angle is defined between a bottom surface of the hoist frame and a horizontal reference plane generally parallel to ground underlying the vehicle and the angle is between about zero degrees and about fifty degrees.

16. The container handling system of claim 15, wherein the angle is about nine degrees when the hoist frame is in the hoist-transition position.

17. The container handling system of claim 15, wherein the angle is about forty-nine degrees when the hoist frame is in the use position.

18. The container handling system of claim 1, wherein the hoist frame extends between a rear end adapted to deploy and retrieve a container and a forward end opposite the rear end and the lift unit engages the forward end of the hoist frame to maximize a moment arm length.

19. The container handling system of claim 1, wherein the lift unit further provides means for cushioning and slowing downward movement of the hoist frame during movement of the hoist frame from the use position to the transport position without use of a modulating input from an operator so that wear and damage to the container handling system is minimized.

20. The container handling system of claim 19, wherein the hoist-frame mover causes the hoist frame to move from the use position toward the transport position when loading a container, the lift unit engages the hoist frame when the hoist frame achieves the hoist-transition position, and the lift unit operates to support the hoist frame and a load thereon as the hoist frame moves to the transport position.

21. The container handling system of claim 19, wherein the lift unit is further configured to move the hoist frame to a mid-lift hoist position that is between the transport position and the hoist-transition position and the hoist unit further includes a hoist arm coupled to a front end of the hoist frame and arranged to engage the lift unit when the hoist frame is in one of the transport, mid-lift hoist, and hoist-transition positions.

22. The container handling system of claim 21, wherein the hoist arm includes a roller support coupled to the hoist frame in a fixed position and a roller coupled to the roller support to rotate relative to the roller support about a roller axis.

23. The container handling system of claim 22, wherein the lift unit is configured to move between a lowered lift position and a raised lift position and the roller is arranged to engage and roll on the lift unit to cause the roller to roll away from the lift unit as the lift unit moves from the lowered lift position toward the raised lift position to minimize friction between the hoist unit and the lift unit while the hoist frame is engaged with the lift unit.

24. The container handling system of claim 1, wherein the lift unit is spaced apart from the hoist frame mover.

25. The container handling system of claim 1, wherein the lift unit is spaced apart from the hoist frame when the hoist frame is in the use position.

26. The container handling system of claim 1, wherein the hoist frame mover is operable independent of the lift unit.

27. A container handling system comprising
a vehicle,
a hoist unit coupled to the vehicle to move therewith and relative to the vehicle, the hoist unit including a hoist frame and a hoist-frame mover coupled to both the vehicle and the hoist frame to cause the hoist frame to move between a transport position in which the hoist frame is generally horizontal and a use position in which the hoist frame is arranged at an angle relative to the horizontal to facilitate deployment and retrieval of a container, and
a lift unit configured to provide lifting means for moving the hoist frame between the transport position and a hoist-transition position without application of substantial force from the hoist-frame mover so that the hoist frame is arranged to cause mechanical advantage to be used in the hoist-transition position so that an amount of power required to move the hoist frame between the transport position and the use position is minimized,
wherein the lift unit includes a carriage foundation coupled to the vehicle in a fixed position, a hoist carriage coupled to the carriage foundation to move relative thereto, and a lift-unit actuator extending between and interconnecting the carriage foundation and the hoist carriage to cause the hoist carriage to move relative to the carriage foundation,
wherein the hoist carriage includes a carriage frame coupled to the carriage foundation to move up and down relative to the carriage foundation and a hoist-arm receiver coupled to the carriage frame to move therewith,
wherein the lift unit is further configured to move the hoist frame to a mid-lift hoist position that is between the transport position and the hoist-transition position, the hoist unit further includes a hoist arm coupled to a front end of the hoist frame and arranged to engage the lift unit when the hoist frame is in one of the transport, mid-lift hoist, and hoist-transition positions,
wherein the hoist arm includes a roller support coupled to the hoist frame in a fixed position and a roller coupled to the roller support to rotate relative to the roller support about a roller axis, and the roller is received in the hoist-arm receiver when the hoist frame engages the lift unit.

28. The container handling system of claim 27, wherein the carriage frame includes a first slide tube, a second slide tube located in spaced apart relation to the first slide tube, the hoist-arm receiver includes a lift pocket configured to receive the roller therein, and the lift pocket is coupled to a lower end of the first slide tube to move therewith and to extend laterally away from the first and second slide tubes.

29. The container handling system of claim 28, wherein the lift pocket includes a floor, a front wall, and a sidewall, the floor is arranged to lie in a generally horizontal plane parallel to ground when the hoist unit is in the transport position, the sidewall is spaced apart from the first slide tube, and the front wall extends between the sidewall and the first slide tube, and the roller lies on the floor and in a spaced-apart relation to the front wall when the hoist unit is in the transport position and the roller rolls on the floor away from the front wall as the hoist unit moves away from and disengages the lift unit.

30. The container handling system of claim 27, wherein the carriage frame includes a first slide tube, a second slide tube located in spaced apart relation to the first slide tube to locate the lift-unit actuator therebetween.

31. The container handling system of claim 30, wherein the carriage frame further includes a lift bracket arranged to extend between and interconnect the first and second slide tubes at upper ends of the slide tubes and the lift-unit actuator is coupled to the lift bracket to cause the hoist carriage to move up and down relative to the carriage foundation.

32. A container handling system comprising
a vehicle,
a hoist unit coupled to the vehicle to move therewith and relative to the vehicle, the hoist unit including a hoist frame and a hoist-frame mover coupled to both the vehicle and the hoist frame to cause the hoist frame to move between a transport position in which the hoist frame is generally horizontal and a use position in which the hoist frame is arranged at an angle relative to the horizontal to facilitate deployment and retrieval of a container, and
a lift unit configured to provide lifting means for moving the hoist frame between the transport position and a hoist-transition position without application of substantial force from the hoist-frame mover so that the hoist frame is arranged to cause mechanical advantage to be used in the hoist-transition position so that an amount of power required to move the hoist frame between the transport position and the use position is minimized,
wherein the lift unit includes a carriage foundation coupled to the vehicle in a fixed position, a hoist carriage coupled to the carriage foundation to move relative thereto, and a lift-unit actuator extending between and interconnecting the carriage foundation and the hoist carriage to cause the hoist carriage to move relative to the carriage foundation,
wherein the carriage foundation includes a foundation support plate coupled to a drivetrain included in the vehicle in a fixed position, a carriage guide coupled to the foundation support plate in a fixed position and arranged to extend upwardly away from the foundation support plate, and a carriage receiver coupled to both the carriage guide and the foundation support plate,
wherein a lift-unit angle is defined between a line generally parallel to an upwardly extending surface of the carriage guide and a horizontal reference plane that is generally parallel to ground underlying the vehicle and the lift-unit angle is about 80 degrees to about 90 degrees.

33. The container handling system of claim 32, wherein the lift-unit angle is about 88 degrees.

34. The container handling system of claim 32, wherein the carriage guide includes a first guide beam and a second guide beam spaced apart laterally from the first guide beam to locate the lift-unit actuator therebetween.

35. The container handling system of claim 34, wherein the first guide beam and the second guide beam are coupled to the foundation support plate in a fixed position and arranged to extend upwardly away from the foundation support plate at the lift-unit angle, the hoist carriage includes a hoist-arm receiver and a carriage frame coupled to the carriage foundation to move up and down relative to the carriage foundation, the carriage frame includes a first slide tube and a second slide tube located in spaced apart relation to the first slide tube to locate the lift-unit actuator therebetween, and the first slide tube is formed to include a passageway sized to receive the first guide beam therein, and the first guide beam is configured to move in the passageway relative to the first slide tube.

36. The container handling system of claim 35, wherein the first slide tube and the first guide beam have rectangular cross sections to minimize rotation of the first slide tube relative to the first guide beam.

* * * * *